H. Ingraham.
Cultivator.
No. 49,111. Patented Aug. 1, 1865.

Witnesses:
W. Burris
Chas. E. McLean

Inventor:
Hanford Ingraham.
By his attorney Gilbert H. Fowler

UNITED STATES PATENT OFFICE.

HANFORD INGRAHAM, OF NAPLES, NEW YORK.

IMPROVEMENT IN CULTIVATORS.

Specification forming part of Letters Patent No. 49,111, dated August 1, 1865.

*To all whom it may concern:*

Be it known that I, HANFORD INGRAHAM, of Naples, in the county of Ontario and State of New York, have invented a new and Improved Cultivator; and I do hereby declare the following to be a full, clear, and exact description of the construction and operation of the same, reference being had to the accompanying drawings, and to the letters of reference marked thereon, making a part of this specification, in which—

Figure 1:
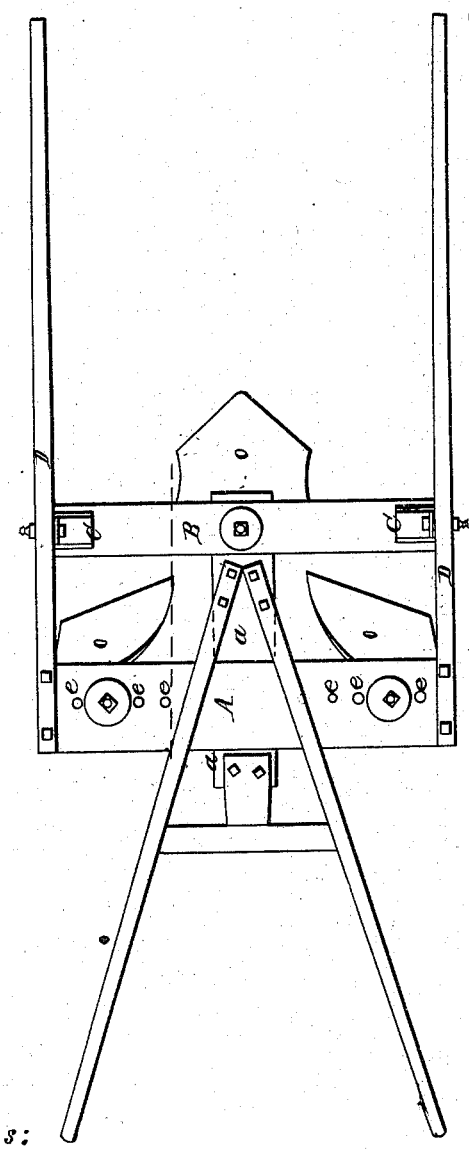
Figure 2:
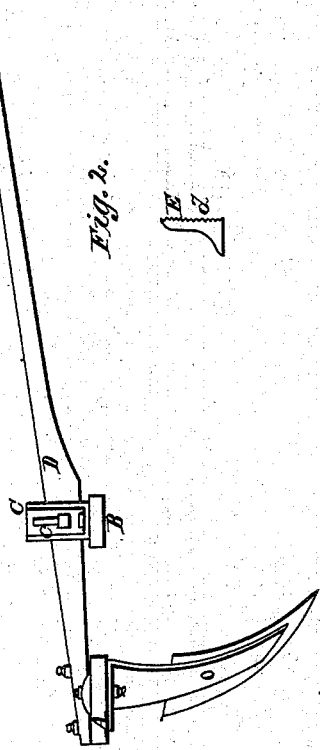

Figure 1 is a top or plan view of my improved cultivator, showing the arrangement of the frame and the slotted knee-braces for adjusting the thills or shafts, which will hereinafter be described. Fig. 2 is a section of the frame as indicated by the line $x\ y$ in Fig. 1, in order to show more clearly the manner of adjusting the thills by the knee-braces.

Like letters indicate corresponding parts in all figures of the drawings.

My improved cultivator is designed to be an improvement in some particulars on that which I patented in December 27, 1864. In that the frame is made in the shape of the letter T, or a beam is attached at one end to the center of a transverse one, approximating to a letter of that shape. In the transverse beam just mentioned there are attached two cultivating-teeth, which beam and teeth are placed at the forward front end of the center beam, and attached at the rear end of this beam is a single cultivating-tooth, ordinary handles being used, such as are used on plows, and attached to near the rear end of the center beam, and secured firmly thereto by a brace made in the shape of the frame above described, the thills or shafts being adjusted by their connection with movable eccentric flange-shaped wedges placed on the ends of the cross-beam. The arrangement of the frame and the adjustment of the thills here described are the substance of the invention embraced under that patent.

The improvement contemplated in this application has reference, first, to a change in the construction of the frame, so that the two cultivating-teeth, instead of being front or forward, (as in the other,) are placed in the rear, the transverse beam to which they are attached being reversed, while the rear single one is moved to the front end of the center beam, by which change the soil thrown off from the sides of the front tooth when the machine is in motion is caught or taken up by the advancing rear teeth, which, in addition to the soil furrowed up by them, presses the quantity thus increased toward the rows, thereby aiding materially in the formation of the hills; secondly, the substitution of knee-braces in place of eccentric flange-shaped wedges for the adjustment of the thills, they being much simpler in their construction and not so apt to get out of order, and more conveniently applied in the adjusting of the thills.

To enable any one skilled in the art to make and use my improved cultivator, I will proceed to describe its construction and operation.

The frame herein referred to is of the utmost lightness and simplicity in its construction, being devoid of that cumbersome weight and complication of parts peculiar to most of those now in use, and thereby rendering it acceptable to a large class of farmers, the small quantity of material used enabling them to be built with but comparatively little trouble. I have a transverse beam, A, bolted on the top and at the end of a beam, $a$, placed in the center thereto. This beam projects forward, and may be termed the "center forward beam." Bolted at the front end and on the top thereof is another transverse beam, B, but of a less width than the other. This beam is intended to support the knee-braces for adjusting the thills, of which I will speak hereinafter.

The center beam in the patented one, which may be termed in that "the rear center beam," is bolted on the top of the transverse beam at the front instead of under, as just above described. The reason for the change is, the thickness of the center beam being under instead of on top, as in the other, obviates the lengthening of the shank of the forward tooth, which would be required were the center beam placed otherwise to the extent of the thickness of the beam, and, besides, the proper elevation of the front or forward part of the machine is preserved, and the thills therewith kept to their proper position by the thickness of the beam across on the top of the center one.

To make it more fully understood, in my patented cultivator there is only one tranverse beam, which is at the front end of the machine. In this it is placed at the rear or back end of the machine for the purpose as herein explained, and an additional transverse beam is placed at the front for supporting the knee-braces for regulating the thills, the center beam retaining the same position as before, except, in changing the beams, it projects forward instead of in the rear.

The knee braces C C, to which reference has been made, are bolted to the top of the front transverse beam, (seen in Fig. 1,) first being placed well against the inside of the thills D, which latter are secured to the top of the rear transverse beam by two bolts in each. In each knee-brace there is a slot, $c$, (seen in Fig. 3,) through which and the thills passes a bolt having screw-threads near the outer ends, with nuts of a suitable size to fit them. The inner end of the bolt is headed to prevent slipping through the slots. The object of this arrangement is to obviate the necessity, or rather inconvenience, of lengthening or shortening the hame-straps to which the thills are connected, arising from the use of a high or low horse, or from other causes, such as will occasion the handling of the straps to regulate the thills by simply loosening the nuts on the bolts and adjusting the thills to the position desired, and then tightening them, the saw-cut edges $d$ (seen at letter E) of the braces against the thills, when tightly screwed, preventing their slipping up or down.

Considerable trouble is experienced frequently in adjusting the hame-straps, in order to have the thills at the proper elevation, by reason of the buckles becoming rusty from exposure and use, rendering it difficult in consequence thereof to unbuckle them. This is overcome by the arrangement above described—the simple tightening or loosening of the nuts being all that is required.

The rear teeth are adjusted to the desired width of the rows by a number of holes, $e$, made at suitable distances apart in the beam, and by changing the shanks to a hole corresponding to the width required. The knee-braces are made of cast-iron, the shape of which is represented in a side view shown at letter E.

Having thus fully described my invention, what I claim therein as new, and desire to secure by Letters Patent, is—

The transverse beams A and B and center forward beam, $a$, in connection with the knee-braces C, as constructed and arranged, substantially in the manner and for the purpose set forth.

HANFORD INGRAHAM.

Witnesses:
JAMES COVEL,
V. O. HART.